US006571559B1

(12) United States Patent
Fortuna et al.

(10) Patent No.: US 6,571,559 B1
(45) Date of Patent: Jun. 3, 2003

(54) ANTI-CARBONING FUEL-AIR MIXER FOR A GAS TURBINE ENGINE COMBUSTOR

(75) Inventors: Douglas M. Fortuna, Cincinnati, OH (US); William T. Houchens, Cincinnati, OH (US); Gary L. Leonard, Cincinnati, OH (US); Phillip D. Napoli, West Chester, OH (US); Paul E. Sabla, Cincinnati, OH (US); Douglas G. Shafer, Cincinnati, OH (US); Jack W. Smith, Jr., Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/054,794

(22) Filed: Apr. 3, 1998

(51) Int. Cl.[7] ................................................. F02C 7/22

(52) U.S. Cl. ........................................................... 60/748
(58) Field of Search ................................... 60/740, 748

(56) References Cited

U.S. PATENT DOCUMENTS 5,833,141 A * 11/1998 Bechtel ....................... 239/406
5,916,142 A *  6/1999 Snyder ......................... 60/748

* cited by examiner

Primary Examiner—Ehud Gartenberg
(74) Attorney, Agent, or Firm—William Scott Andes; Sonnenschein, Nath & Rosenthal

(57) ABSTRACT

A fuel-air mixer for a gas turbine engine combustor having a primary swirler and a venturi that effectively reduces carboning via purge air. Purge air flows axially through the fuel-air mixer forming a boundary layer of air on the inner surface of the venturi. The boundary layer of air minimizes the amount of fuel contacting the inner surface of the venturi resulting in reduced carbon resin or coke formation.

7 Claims, 2 Drawing Sheets

ANTI-CARBONING FUEL-AIR MIXER FOR A GAS TURBINE ENGINE COMBUSTOR

BACKGROUND OF THE INVENTION

This invention relates to a fuel-air mixer for a combustor of a gas turbine engine and more particularly to a means of reducing the formation of carbon resin on such a fuel-air mixer.

Gas turbine engines generally comprise a compressor for pressurizing air and a combustor for mixing and burning fuel with the air. The heated mixture is then flowed into a turbine to generate power. Fuel that is burned is normally premixed with air prior to undergoing combustion in order to minimize smoke and other undesirable by-products and to maximize the efficiency of the combustion process.

A fuel-air mixer is designed to atomize the fuel and to premix it with air in order to produce efficient and complete combustion. Low pressure fuel-air mixers have been designed which incorporate primary and secondary counterrotational air swirlers which atomize fuel by the high shear forces developed in the area or zone of interaction between the counterrotational flows. These air swirlers are typically known as swirler cups and comprise annular air chambers having tangential air jets formed therein. The tangential air jets swirl the air prior to intermixing with the fuel to enhance atomization as well as mixing.

A very common problem with fuel-air mixers is the formation of carbon resin and/or coke, commonly referred to as carboning. Both carbon resin and coke consist of a build up of carbon caused by unburned fuel being heated at nonstoichiometric conditions on hot surfaces. Carbon resin is typically made up of eighty percent carbon and 20 percent oxygen with traces of nitrogen and sulfur. Carbon resin is typically formed at temperatures between 300 and 900° F. On the other hand, coke is nearly 100% carbon and is formed at temperatures in excess of 1000° F. The surface temperature of a typical fuel-air mixer exposed to fuel and compressor discharge air during operation is less than 1000° F. making it more prone to carbon resin formation than coke formation. This formation of carbon resin leads to build up which clogs passageways resulting in degradation of engine operation and in some cases, severe engine damage. For industrial gas turbines, which burn heavy diesel fuels, the potential for carbon resin formation on fuel-air mixers is greater. Heavy diesel fuels contain heavy hydrocarbons with long evaporation times which results in longer dwell times on wetted surfaces. Extensive carboning can result in obstructed venturi passages blocking the flow of fuel. This condition impairs engine performance and can cause fuel to collect at low points in the combustor case, ultimately igniting, and burning through the case.

SUMMARY OF THE INVENTION

The present invention is directed to a fuel-air mixer for the combustor of a gas turbine engine that reduces carboning in the venturi of the fuel-air mixer.

The fuel-air mixer comprises a substantially annular venturi defined by a wall having an inner surface and a longitudinal axis therethrough and includes an upstream end and a downstream end. A primary swirler having an annular upstream end and a downstream end located adjacent to the upstream end of the venturi, includes a plurality of primary air jets interposed between the upstream and downstream ends of the primary swirler. Airflow supplied to the primary air jets is swirled and subsequently delivered to the venturi. A fuel nozzle, positioned inside the upstream end of the primary swirler and adjacent to the venturi, includes a fuel passage therein through which fuel is sprayed into the venturi at a designated spray angle. Purge airflow circumscribing the fuel passage flows substantially parallel to the longitudinal axis of the venturi providing a boundary layer of air along the inner surface of the venturi. The boundary layer of air minimizes the amount of fuel contacting the inner surface of the venturi subsequently reducing carboning.

BRIEF DESCRIPTION OF THE DRAWINGS

These and other features, aspects, and advantages of the present invention will become better understood with regard to the following detailed description and appended claims taken in conjunction with the accompanying drawings where:

DESCRIPTION OF THE INVENTION

Figure 1:
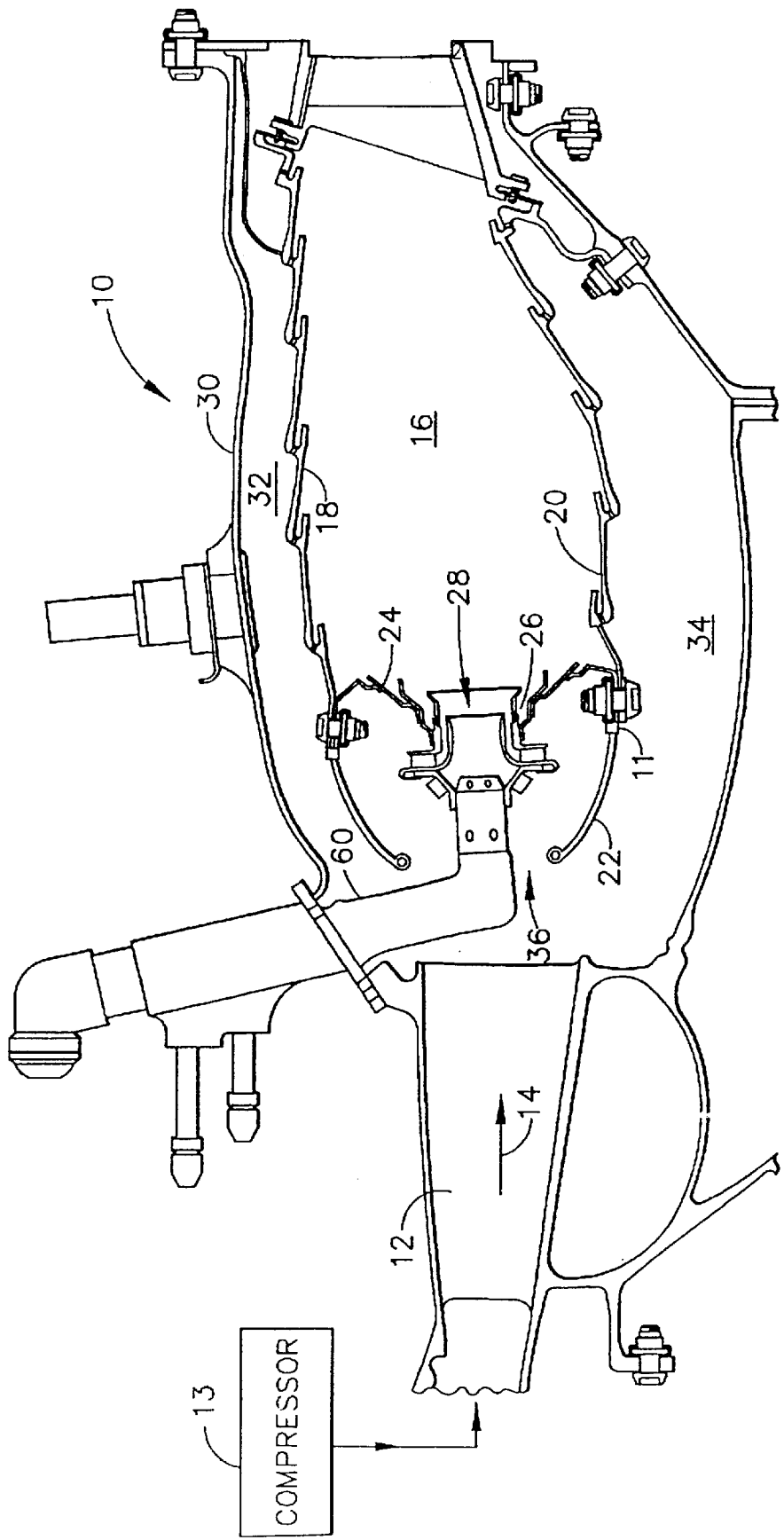
FIG. 1 shows a cross sectional view of an exemplary gas turbine engine combustor.

Illustrated in FIG. 1 is an exemplary gas turbine engine combustion section 10 which is downstream of a compressor diffuser 12 of an axial flow compressor 13 and in fluid communication with compressor discharge air 14. The combustion section 10 includes a combustor 11 which circumscribes a combustion chamber 16 therein. The combustor 11 is generally annular in form and is comprised of an outer liner 18 an inner liner 20 and a generally dome-shaped end 22. A combustor bulkhead 24, attached to the outer and inner liners 18 and 20, includes a plurality of circumferentially spaced openings 26, each having disposed therein an improved fuel-air mixer 28 for the delivery of fuel and air into the combustion chamber 16. A typical combustor has thirty fuel-air mixers 28.

The combustor 11 is enclosed by a casing 30 which together with the outer liner 18 and the inner liner 20 define an annular outer passage 32 and an inner passage 34 respectively. The dome shaped end 22 includes a plurality of apertures 36 for supplying compressor discharge air 14 to the fuel-air mixers 28.

Figure 2:
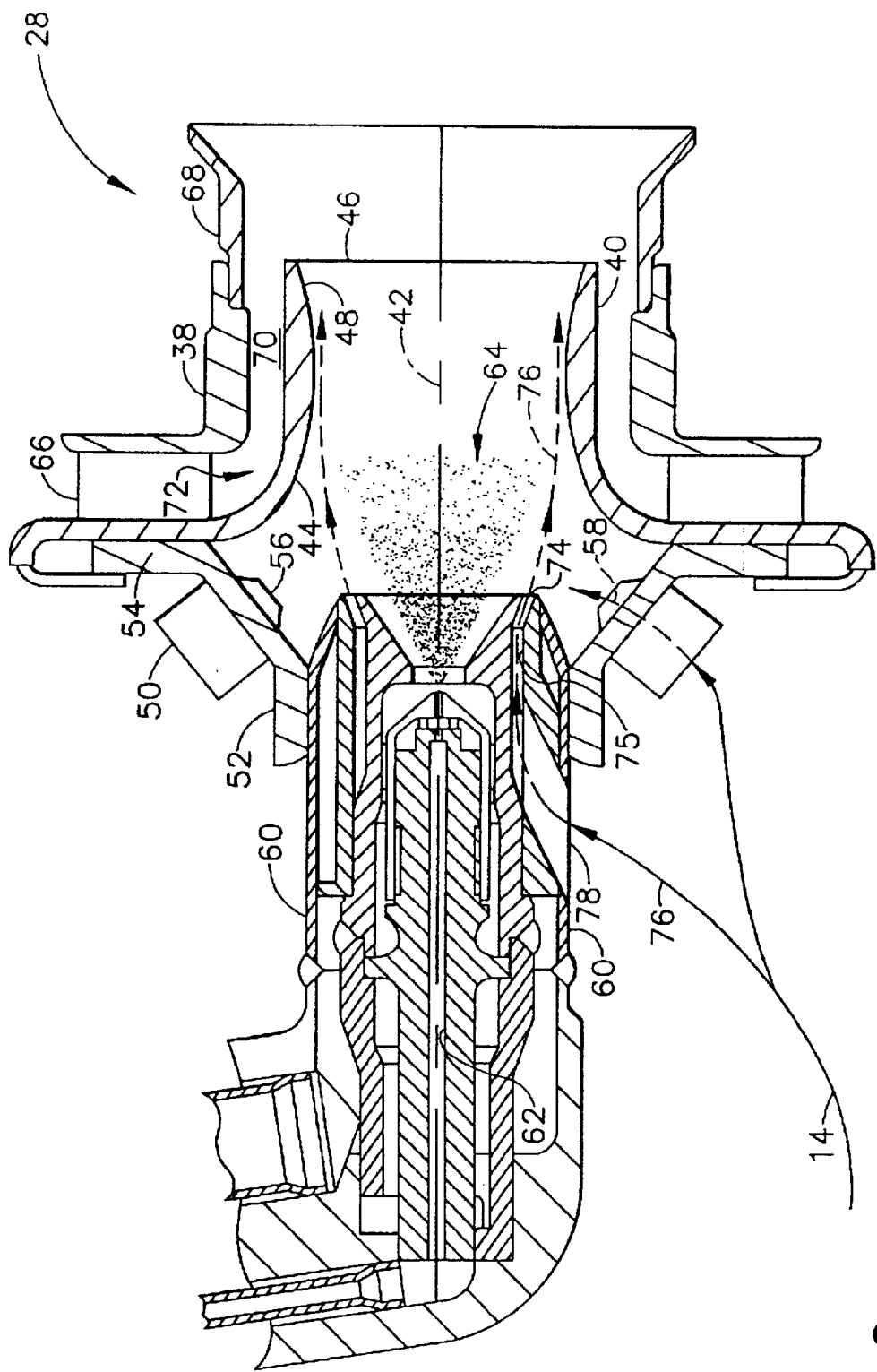
FIG. 2 shows a fuel-air mixer of the exemplary gas turbine engine combustor depicted in FIG. 1.

As shown in FIG. 2, each fuel-air mixer 28 comprises a casting 38 having a substantially annular venturi 40 positioned therein. The venturi 40 has a longitudinal axis 42 therethrough and includes an upstream end 44, a downstream end 46, and an inner surface 48. The upstream end 44 of the venturi abuts a primary swirler 50. The primary swirler 50 is defined by a generally annular upstream portion 52 and a conical downstream portion terminating at a radial flange 54. Interposed between primary swirler portions 52 and 54 are a plurality primary air jets 56. The primary air jets 56 are disposed around the circumference of the primary swirler 50 and are tangentially directed so that compressor discharge air 14 entering the primary air jets 56 is swirled to produce primary swirler jet airflow 58. The venturi 40 is positioned with respect to the primary swirler 50 to enable the primary swirler jet airflow 58 to enter the venturi 40 in a swirling manner.

A fuel nozzle 60 is disposed in the annular upstream end 52 of the primary swirler 50 in alignment with the longitudinal axis 42 of the venturi 40. The fuel nozzle 60 includes a fuel passage 62 for spraying fuel 64 at a designated spray angle into the venturi 40 where it is atomized and mixed with the primary swirler air 58.

Included in the casting 38 is a secondary air swirler 66, circumferentially disposed about and radially spaced apart from the venturi 40. Compressor discharge air 14 flows into the secondary air swirler 66 and is directed by a plurality of secondary swirler vanes disposed in the casting 38 preferably equidistant from one and other and angled to induce a swirl on the flowing compressor discharge air. The secondary swirler vanes may be angled in the same or different tangential direction as the primary swirler air jets 56. A bellmouth shaped exhaust or fairing 68 is attached to the casting 38 and extends aft of the venturi downstream end 46. The fairing 68 is positioned and spaced so as to, in combination with the casting 38, form a fluid passageway 70 through which secondary swirler air 72 flows. This secondary swirler air 72 intermixes with the primary swirler jet airflow 58 and fuel 64 mixture aft of the downstream end 46 of the venturi 40, thereby further atomizing and mixing the fuel and air for combustion.

The fuel-air mixer arrangement described typically operates at temperatures approaching 1000° F. The centrifugal effect of the fuel intermixing with the primary swirler jet airflow in the venturi 40 results in fuel wetting the inner surface 48 of the venturi 40 which lowers the surface temperature and under certain conditions, initiates predominately carbon resin formation and in some cases coke formation both of which are commonly referred to as carboning.

Compressor discharge air 14 flowing through the fuel-air mixer 28 in the axial direction can be utilized to form a boundary layer of air on the inner surface 48 of the venturi 40 to minimize the amount of fuel contacting the surface and subsequently reduce carboning. This axially flowing compressor discharge air 14 is referred to as purge airflow 76.

The purge airflow 76 may be introduced into the fuel-air mixer 28 by any arrangement producing axial flow that is parallel to the longitudinal axis 42 of the venturi 40. A preferred arrangement for delivering purge airflow to the fuel-air mixer 28 includes providing the fuel nozzle 60 with a shroud 74 which defines an annular air passage 75. At least one aperture 78 is disposed in the fuel nozzle 60 upstream of the shroud 74 and in flow communication with the air passage 75 for supplying compressor discharge air 14 thereto. The purge airflow 76 is thus discharged from the air passage 75 into the venturi 40.

The total airflow flowing through the venturi 40 is the sum of primary swirler jet airflow 58 and the purge airflow 76. The purge airflow 76 exiting the shroud 74 must overcome the whirling effect of the primary swirler jet airflow 58 in order to produce the boundary layer of air on the inner surface 48 of the venturi 40 to minimize the amount of fuel contacting the surface 48 and effectively reduce carboning thereon. This requires evaluating the quantity of purge airflow 76 required relative to primary swirler jet airflow 58 to produce such a boundary layer. For a typical gas turbine engine combustor 10, a preferred arrangement of fuel-air mixers 28 is one having a total primary swirler jet airflow 58 through all fuel-air mixers 28 ranging from 3.9 to 5.5 percent compressor discharge air 14 and purge airflow 76 through all fuel-air mixers 28 ranging from 2.4 to 3.2 percent compressor discharge air 14. Another preferred arrangement of fuel-air mixers is one having a total primary swirler jet airflow 58 through all fuel-air mixers ranging from 3.2 to 4.7 percent compressor discharge air 14 and purge airflow 76 through all fuel-air mixers ranging from 3.2 to 3.9 percent compressor discharge air 14. Likewise, another preferred arrangement of fuel-air mixers is one having a total primary swirler jet airflow 58 through all fuel-air mixers ranging from 3.2 to 3.9 percent compressor discharge air 14 and purge airflow 76 through all fuel-air mixers ranging from 3.9 to 4.7 percent compressor discharge air 14.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A fuel-air mixer for a combustor of a gas turbine engine having a compressor for discharging compressed air to said combustor, said fuel-air mixer comprising:

(a) a substantially annular venturi defined by a wall having an inner surface and a longitudinal axis therethrough, said venturi including an upstream end and a downstream end;

(b) a primary swirler comprising a substantially annular upstream end and a downstream end located adjacent the upstream end of said venturi along the longitudinal axis, a plurality of primary air jets interposed between the swirler upstream and downstream ends, and primary swirler jet airflow supplied to said primary air jets wherein said swirler airflow is swirled and delivered to said venturi; and (c) a fuel nozzle positioned inside the upstream end of said primary swirler adjacent to said venturi and along the longitudinal axis thereof, said fuel nozzle further comprising a fuel passage therein through which fuel is sprayed into said venturi at a designated spray angle; and an air passage therein through which purge airflow is discharged into said venturi, substantially parallel to the longitudinal axis of said venturi; wherein said purge airflow is sufficient to provide a boundary layer of air along the inner surface of said venturi wall.

2. The fuel-air mixer of claim 1, wherein said fuel nozzle further comprises a shroud defining said air passage.

3. The fuel-air mixer of claim 2, wherein the fuel nozzle further comprises at least one aperture disposed upstream of said shroud and in flow communication with said air passage.

4. A combustor for a gas turbine engine having a compressor for discharging compressed air to said combustor, said combustor including a plurality of fuel-air mixers wherein each said fuel-air mixer comprises:

(a) a substantially annular venturi defined by a wall having an inner surface and a longitudinal axis therethrough, said venturi including an upstream end and a downstream end;

(b) a primary swirler comprising a substantially annular upstream end and a downstream end located adjacent the upstream end of said venturi along the longitudinal axis, a plurality of primary air jets interposed between the swirler upstream and downstream ends, and primary swirler jet airflow supplied to said primary air jets wherein said swirler airflow is swirled and delivered to said venturi; and (c) a fuel nozzle positioned inside the upstream end of said primary swirler adjacent to said venturi and along the longitudinal axis thereof, said fuel nozzle further comprising a fuel passage therein through which fuel is sprayed into said venturi at a designated spray angle; and an air passage therein through which purge airflow is discharged into said venturi, substantially parallel to the longitudinal axis of said venturi; wherein said purge airflow is sufficient to provide a boundary layer of air along the inner surface of said venturi wall.

5. The combustor of claim 4, wherein purge airflow is about 2.4 to 3.2 percent of compressor discharge air and the primary swirler jet airflow is about 3.9 to 5.5 percent of compressor discharge air.

6. The combustor of claim 4, wherein the purge airflow is about 3.2 to 3.9 percent of compressor discharge air and the primary swirler jet airflow is about 3.2 to 4.7 percent of compressor discharge air.

7. The combustor of claim 4, wherein the purge airflow is about 3.9 to 4.7 percent of compressor discharge air and the primary swirler jet airflow is about 3.2 to 3.9 percent of compressor discharge air.

* * * * *